June 18, 1957     E. I. BARTH     2,796,360
METHODS OF COATING ARTICLES WITH FLUORESCENT
POLYMERIZED CHLOROPRENE
Filed June 28, 1954
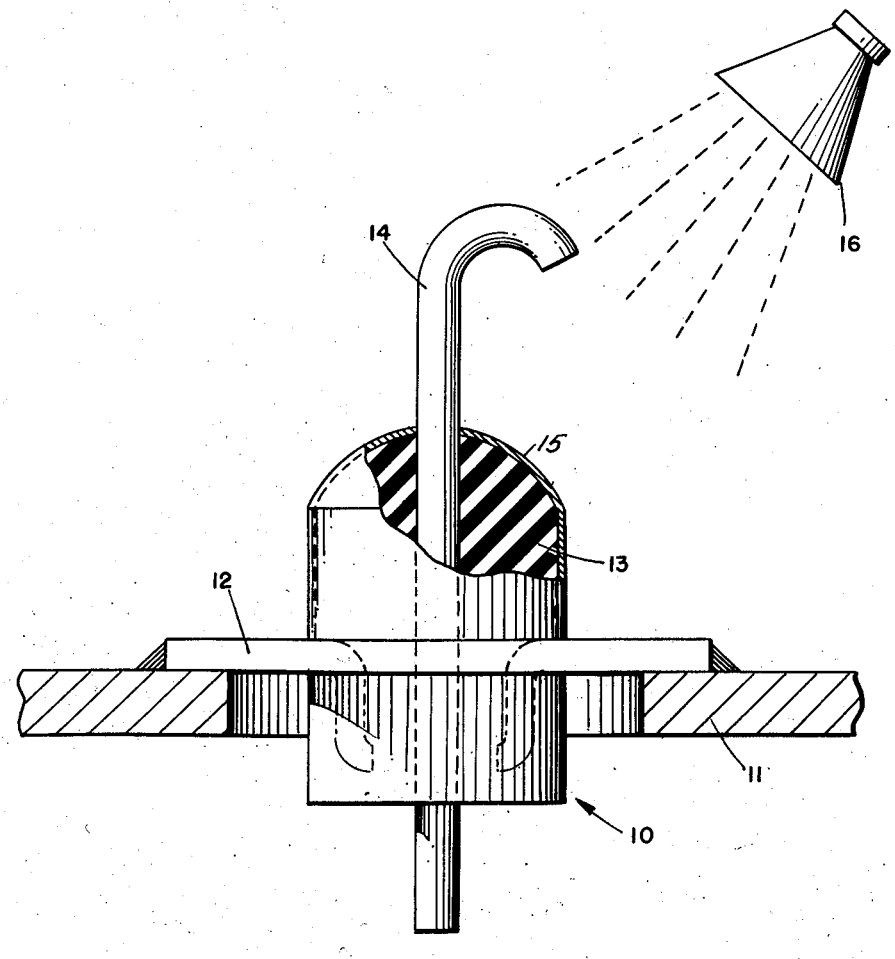
INVENTOR:
E. I. BARTH
BY
ATTORNEY

United States Patent Office 2,796,360
Patented June 18, 1957

2,796,360

METHODS OF COATING ARTICLES WITH FLUORESCENT POLYMERIZED CHLOROPRENE

Eugene I. Barth, Indianapolis, Ind., assignor to Western Electric Company, Incorporated, New York, N. Y., a corporation of New York Application June 28, 1954, Serial No. 439,667

2 Claims. (Cl. 117—66)

This invention relates to methods of coating articles with synthetic rubber, and more particularly to methods of coating natural rubber articles with protective coverings of polymerized chloroprene paint.

In the manufacture of natural rubber articles which are exposed to sunlight, such as, for example, insulating bushings of encased electrical networks, the articles are coated with a polymerized chloroprene paint to protect the articles against deterioration from sunlight. Where it is desired to coat the article with a coating of the same color as the article itself, hitherto it has been difficult for operators applying the coating to see whether complete coverage is obtained, particularly where the articles being coated are small.

An object of the invention is to provide methods of quickly coating articles with synthetic rubber.

Another object of the invention is to provide methods of completely coating small natural rubber articles with polymerized chloroprene paint.

In a method illustrating certain features of the invention, ultraviolet light is directed on a natural rubber article of one color and simultaneously the article is painted with polymerized chloroprene of the same color which fluoresces to a different color so that complete coverage of the article may be obtained quickly.

A complete understanding of the invention may be obtained from the following detailed description of a method forming a specific embodiment thereof, when read in conjunction with the appended drawing, in which the single figure is a partly sectional, partly elevational view of an article produced by a method forming one embodiment of the invention.

Referring now in detail to the drawing, there is shown therein a terminal 10 soldered to a can 11 enclosing an electrical element (not shown) such as a capacitor, a resistor or a network. The terminal 10 includes a flanged bushing 12 embedded in a bushing 13 composed of a black natural rubber compound sealed to the bushing 12 and to a lead 14 to waterproof the interior of the can. A coating 15 of black Neoprene (polymerized chloroprene) paint is applied to the portion of the bushing 13 to protect the bushing from light, thereby preventing deterioration of the rubber compound from exposure to the sunlight. The Neoprene paint forms a thin protective shield, and is applied manually with a brush while the bushing 13 is under an ultraviolet ray lamp 16, which directs ultraviolet rays on the bushing.

The extent of coverage of the paint on the bushing may be readily seen while the bushing is under the ultraviolet rays because, while under normal light both the Neoprene paint and the natural rubber compound are black, the natural rubber compound appears black and the Neoprene paint fluoresces to a readily distinguishable green. Hence, by applying the Neoprene paint under the ultraviolet light, complete coverage may be obtained quickly and with no waste motion.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. The method of coating a non-fluorescent article with a polymerized chloroprene coating composition where the coating and the article are both of the same color when viewed in natural light, which comprises the steps of coating the article with a coating composition consisting primarily of polymerized fluorescent chloroprene free of other fluorescent materials, subjecting the coated article to ultra-violet light to cause the polymerized chloroprene to fluoresce and thereby to assume a color differing from the non-fluorescent article, and applying additional coating composition to those portions of the surface exhibiting the least fluorescence.

2. The method of coating a non-fluorescent natural rubber article with a polymerized chloroprene coating composition where the coating and the article are both of the same color when viewed in natural light, which comprises the steps of coating the natural rubber article with a coating composition consisting primarily of polymerized fluorescent chloroprene free of other fluorescent materials, subjecting the coated natural rubber article to ultra-violet light to cause the polymerized chloroprene to fluoresce and to assume a color differing from the non-fluorescent natural rubber article, and applying additional coating composition to those portions of the surface exhibiting the least fluorescence.

References Cited in the file of this patent

UNITED STATES PATENTS

| 2,137,686 | Habgood | Nov. 22, 1938 |
| 2,167,972 | Crawford | Aug. 1, 1939 |

FOREIGN PATENTS

| 690,696 | Great Britain | Apr. 29, 1953 |